UNITED STATES PATENT OFFICE.

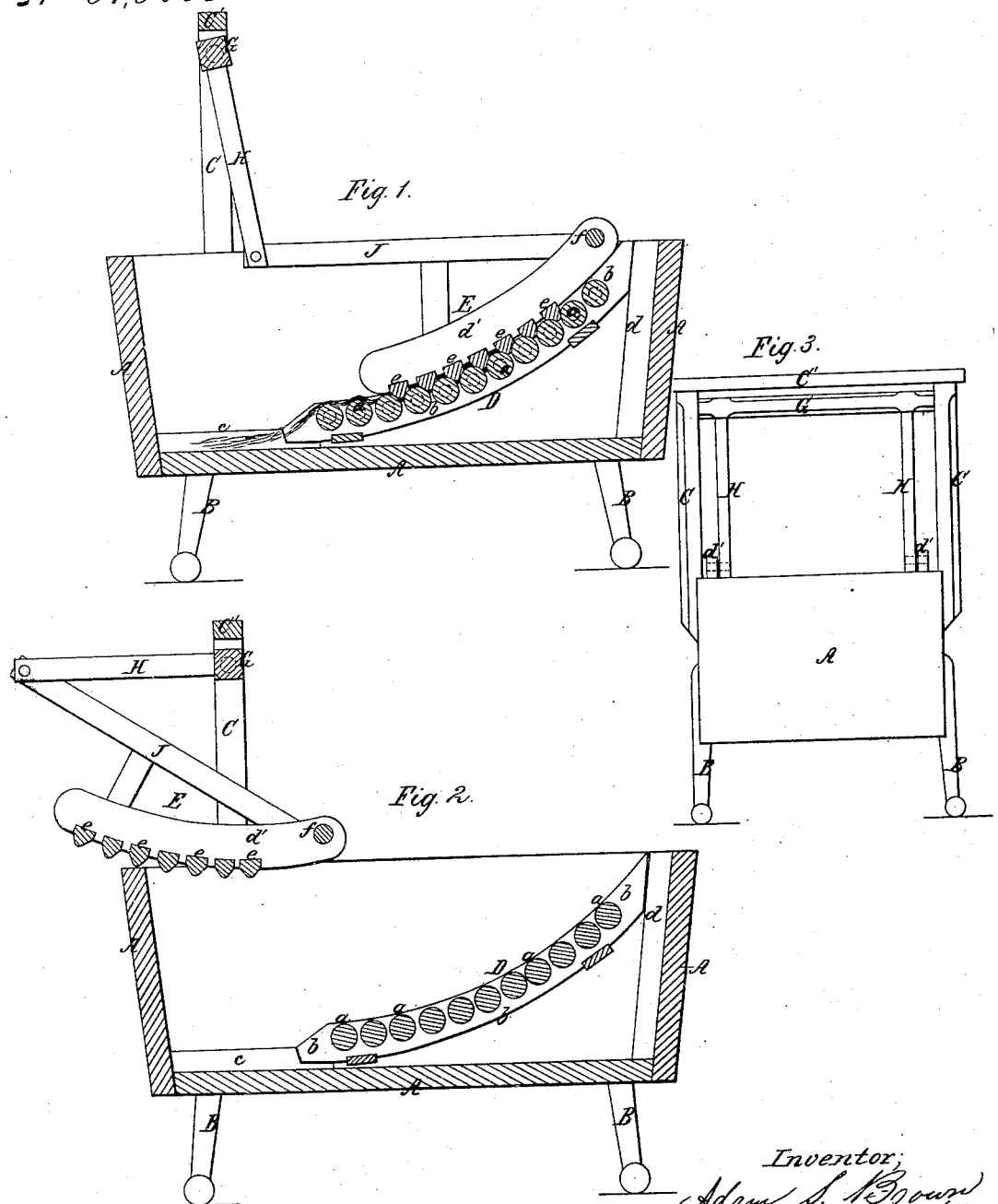

ADAM S. BROWN, OF LEBANON, PENNSYLVANIA.

IMPROVED WASHING-MACHINE.

Specification forming part of Letters Patent No. 37,900, dated March 17, 1863.

*To all whom it may concern:*

Be it known that I, ADAM S. BROWN, of Lebanon, in the county of Lebanon and State of Pennsylvania, have invented a new and Improved Washing-Machine; and I do hereby declare that the following is a full, clear, and exact description thereof, reference being had to the accompanying drawings, making a part of this specification, in which—

Figure 1 is a vertical longitudinal section through the center of my improved machine, showing the same in operation. Fig. 2 is a similar view, with the rubber thrown up on the end of the wash-box, out of the way. Fig. 3 is an elevation of one end of the machine.

Similar letters of reference indicate corresponding parts in the three figures.

This invention is an improvement on that class of washing machines wherein a curved bed and a corresponding rubber are used, and wherein the rubber is pivoted concentrically with the arc of the curved bed and receives an alternate reciprocating motion from the hands of the operator in the act of washing the clothes.

To enable others skilled in the art to make and use my invention, I will proceed to describe its construction and operation.

The quadrangular wash box or tub A is made water-tight and mounted on legs B B B B. This box is oblong, and it may be made of any suitable capacity.

C C are two upright standards, which are secured one on each side of the box A, near its rear end, and connected together at their upper ends by a horizontal transverse brace, C', as shown in Fig. 3 of the drawings.

D represents the concave roller-bed or wash-board, which consists of two curved side bars, $b\ b$, properly secured together, and the cylindrical rollers $a\ a\ a$, which have their end bearings in the side pieces. The rollers, which, if found desirable, may be made octagonal or sextagonal, are arranged in the concave parallel with each other, leaving a space between each roller to allow the ends to pass freely through. It is intended that this bed shall be so arranged within the wash-box A that it can be taken out at pleasure for removing the washed articles, and also for cleaning out the tub; and for this purpose the lower end of the bed D abuts against the notched pieces $c\ c$, which are secured on the bottom and on each side of the box A. The upper ends of the side bars $b\ b$ rest against the forward end of the wash-box or against the upright pieces $d\ d$, as shown in Figs. 1 and 2 of the drawings. This concave wash-board is inclined from the forward end of the wash-box downward, and extends from a point which is near the top of the forward end of the wash-box to a point which is near the rear end of this box, as shown in Figs. 1 and 2 of the drawings.

The rubber E is composed of two side bars, $d'\ d'$, connected together by the transvere angular-faced rubbing-slats $e\ e$, and the transverse handle $f$. This rubber E is curved, so as to correspond with the concave surface of the wash-board D, and the angular-faced slats $e\ e$ fit between the rollers $a\ a\ a$ of this board, as shown in Fig. 1 of the drawings. The rubber E is not quite as long as the wash-board D, and this rubber is hung from a transverse rock-shaft, G, which is pivoted to the standards C C, near their upper ends, by means of the arms H H and J J. The two pendent arms H H are fixed rigidly at their upper ends to the rock-shaft G, and these arms are just short enough to swing clear of the rear end of the wash-box A. The lower ends of these swinging arms H H are pivoted to the two arms J J, which are fixed rigidly to the sides of the rubber E and project from the forward or upper end of this rubber some distance beyond and above its lower or rear end, as shown in Figs. 1 and 2 of the drawings. The arms H H and J J are of such a length that they allow the slats of the rubber E to work over and between the rollers $a\ a\ a$ of the concave wash-board D, and to give a thorough rubbing action to articles which are placed on this board D, and to squeeze and force the suds from these articles through or between the rollers $a\ a\ a$ as the rubber is worked back and forth over this wash-board. The arms H H and J J will also allow the rubber E to be pushed back and supported upon the edge of the rear end of the wash-box A, as shown in Fig. 2 of the drawings, when it is desired that this rubber shall be out of the way. The axes of motion of the rubber E are so arranged with relation to the arc of the wash-board D that this rubber will accommodate itself to the varying thicknesses of articles which are to be washed in the machine, and at the same time give a uniform rubbing action to these articles, and also move these articles about on the wash-board D, so that they will continually present new surfaces to the action of the rubbing-slats. Then, again, it will be seen that by pivoting the arms J J of the rubber to the swinging and supporting arms H H, as above described, I leave the forward or upper end of this rubber E free to be moved up or down independently of the swinging arms H H. I am enabled by this arrangement to accomplish two very important objects—viz., to move the articles undergoing the washing process upward and over the upper roller of the wash-board into the compartment which is under this wash-board, and thus present new surfaces to the action of the rubber as fast as one surface is clean, without handling the articles; and I am also enabled to give a serpentine or rocking motion to the rubber, caused by the angular-faced slats $e\ e$ passing over and between the rollers $a\ a\ a$ of the wash-board, which motion is found to be very important in squeezing and beating out the suds from the clothes and dissolving the dirt.

The operation of my invention is as follows: Articles which are to be washed are put in the machine at the bottom of the wash-board D, and the tub filled about half-full of water and soap. One end of an article is spread over the rollers in the wash-board, and the rubbing-slats $e\ e$ are brought down on the wash-board and moved back and forth thereon. As fast as the washing operation is completed upon one portion of an article, the operator presses the upper end of the rubber down hard upon the wash-board in its upward stroke, and this causes the slats $e\ e$ to draw the article upward, so as to present a new surface to the rubbing action. This operation is repeated until the article is thoroughly rubbed and finally drawn into the compartment below the wash-board. If desirable, the articles (a number of them) may be attached together previously to putting them in the tub, and every article may in this way be washed without handling. When the operation is through, the rubber may be pushed back and held up by the rear end of the wash-box in the position indicated by Fig. 2 of the drawings, where it will dry, ready for use again.

Having thus described my invention, what I claim as new, and desire to secure by Letters Patent, is—

The combination and arrangement of the slatted rubber E, concave wash-board D, jointed arms H H J J, and rock-shaft G, substantially as and for the purposes herein described.

Witness my hand in the matter of my application for a patent on improved washing-machine.

ADAM S. BROWN.

Witnesses:
GUSTAVE DIETERICH,
JOSEPH SHORT.